(12) United States Patent
Becker et al.

(10) Patent No.: US 7,565,456 B2
(45) Date of Patent: Jul. 21, 2009

(54) METHOD FOR RECONFIGURING AN AUTOMATION DEVICE

(75) Inventors: Peter Becker, Gaggenau (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 22 days.

(21) Appl. No.: 10/961,212

(22) Filed: Oct. 12, 2004

(65) Prior Publication Data

US 2005/0160192 A1 Jul. 21, 2005

Related U.S. Application Data

(63) Continuation of application No. PCT/DE03/01237, filed on Apr. 11, 2003.

(30) Foreign Application Priority Data

Apr. 12, 2002 (DE) ................. 102 16 288

(51) Int. Cl.
*G06F 3/00* (2006.01)
(52) U.S. Cl. .................. 710/8; 710/302; 710/304
(58) Field of Classification Search ............. 700/1, 700/3; 710/8, 302, 304
See application file for complete search history.

(56) References Cited

U.S. PATENT DOCUMENTS 5,980,078 A * 11/1999 Krivoshein et al. ............. 700/1
6,731,596 B1 * 5/2004 Chiang et al. ................ 370/217
7,159,063 B2 * 1/2007 Sivertsen .................... 710/306

FOREIGN PATENT DOCUMENTS

EP 0 598 297 A2 5/1994
WO WO 00/69116 A2 11/2000

OTHER PUBLICATIONS

"Microsoft Computer Dictionary," 2002, Fifth edition, p. 412.*
"Microsoft Computer Dictionary," 2002, Fifth edition, p. 378.*
Wikipedia: Hot Swapping, pp. 1-3.*
Siemens, Katalog ST70, Chapter 4, "Simatic S7-400 Power SPS," 2001, pp. 4/1-4/68.
Siemens, Katalog ST70, Chapter 6, "Dezentrale Peripherie", 2001, pp. 6/1-6/4.
Siemens, Katalog ST PCS 7, Chapter 1, "Simatic Prozessleitsystem Simatic PCS 7," Apr. 2001, pp. 1-30.
Profibus Manuel Technique, Brochure No. 4.002-FR Sep. 1999, Profibus International, pp. 1-34.

* cited by examiner

*Primary Examiner*—Alford W. Kindred
*Assistant Examiner*—Chun-Kuan Lee
(74) *Attorney, Agent, or Firm*—Sughrue Mion, PLLC

(57) ABSTRACT

A method for configuring or reconfiguring an automation device and an automation device suitable for a configuration or a reconfiguration are provided. The automation device has a programmable controller (14) with a CPU unit (14a) and decentralized peripheral devices (16, 17, 18). In this method and automation device, newly supplied configuration data can be evaluated for changes in the hardware configuration and can be integrated during a configuration or a reconfiguration interval (21) without the automation device having to switch to a STOP mode. As a result, it is not necessary for centralized and/or decentralized peripheral modules to adopt a controlled (safe) state, which means that control can be resumed immediately after the reconfiguration.

20 Claims, 2 Drawing Sheets

14. Programmable Controller
14a. CPU Unit
14b, 14c. Centralized Peripheral Modules
15. Master Module
16, 17, 18. Decentralized Peripheral Devices
16a, 17a, 18a. Head Modules
16b, 16c, 17b, 17c, 17d, 18b, 18c. Peripheral Modules
16d, 18d. Additional Peripheral Modules 19. Memory
20. Cycle
21. Reconfiguration Time Interval

METHOD FOR RECONFIGURING AN AUTOMATION DEVICE

This is a Continuation of International Application PCT/DE03/01237, with an international filing date of Apr. 11, 2003, which was published under PCT Article 21(2) in German, and the disclosure of which is incorporated into this application by reference.

FIELD AND BACKGROUND OF THE INVENTION

1. Field of the Invention

The present invention relates to a method for a configuration and/or reconfiguring an automation device and to an automation device. In particular, the present invention relates to a method for reconfiguring an automation device, where the automation device has a hardware configuration with a number of hardware components, and a control program executed by a CPU for controlling a technical process.

2. Description of Related Art

Siemens Catalog ST 70, Chapter 4, 2001 Edition, which is incorporated herein by reference, describes an automation system at the upper performance range provided for solving automation tasks in the field of production engineering, process engineering, and systems control engineering. Components of this automation system are CPU modules, communication modules, peripheral modules, e.g., in the form of input/output modules, and functional modules, which are interconnected via a bus. Chapter 6 of the Siemens Catalog ST 70, which is incorporated herein by reference, discloses so-called "decentralized peripherals" for decentralized solutions to automation tasks. These "decentralized peripherals" typically include various peripheral devices that are provided with a number of peripheral modules, which are connected to a master module via a bus. The master module can be a component of the aforementioned automation system.

Actuators and/or sensors can be connected to the peripheral modules of both the automation system and the "decentralized peripherals." Peripheral process input data transmitted by the sensors can be supplied to the CPU module of the automation system as an image of these peripheral process input data. From these images of peripheral process input data, a control program executed by the CPU module generates images of peripheral process output data. These generated images can then be supplied to the actuators as peripheral process output data.

To enable the CPU module to perform read and/or write accesses to the centralized and decentralized peripheral modules during an open loop control or a closed loop control, an engineering system known, for example, from Siemens Catalog ST PCS 7, Chapter 1, 2001 Edition, is used in a configuration phase. Siemens Catalog ST PCS 7, Chapter 1, 2001 Edition is incorporated herein by reference. This engineering system is used in the configuration phase to first configure the hardware and then to store the configuration data accumulated during this configuration phase in a memory of the automation system. The configuration data contain parameters defining the behavior and the physical characteristics of the entire automation system. The CPU module administers the configuration data.

For example, some of these configuration data define the existence and the behavior of the peripheral modules. These parameters are converted in the CPU module and are stored in a memory of the CPU module. This information, hereinafter referred to as a configuration list, is used by the control program. The configuration list defines, for example, the addressing of the peripheral modules and/or determines, for example, the scaling of process values.

The hardware configuration may need to be changed, for example, due to changes in the control task to be solved. To change the hardware configuration, the automation device must be expanded, for example, by an additional centralized and/or decentralized peripheral module. Changing the hardware configuration means that the configuration data must be changed and, subsequently, that the configuration list must be adapted accordingly. To adapt the configuration list, the process must in turn be brought to a defined safe state. To switch the process to a safe state, the CPU module switches from a "RUN" mode to a "STOP" mode, such that the centralized and decentralized peripheral modules assume a controlled state. After the CPU module has adapted the configuration list, the process is switched back to a "RUN" mode. In the "RUN" mode, the control program assumes control of the process peripherals, and the system quits the controlled (safe) state.

OBJECTS OF THE INVENTION

One object of the present invention is to provide a method for configuration and/or reconfiguring an automation device. Another object of the present invention is to simplify the configuration and/or reconfiguration of an automation device. Yet a further object of the invention is to provide an automation device suitable for a simplified configuration and/or reconfiguration.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an exemplary, non-limiting formulation of the present invention, a method for reconfiguring an automation device is provided. In this method, the automation device has a hardware configuration with a number of hardware components. In addition, the automation device has a control program for controlling a technical process. This control program is cyclically executed by a CPU. Configuration data can be supplied to the automation device. This configuration data signals, to the CPU of the automation device, the hardware configuration of the automation device. From this configuration data, the CPU generates one or more configuration lists, to which the CPU performs a read access and/or a write access during an open loop control. In this method, the supplied configuration data is evaluated for a change in the hardware configuration. Moreover, a reconfiguration time interval is inserting into the cycle of the control program when a change in the hardware configuration is detected. Finally, during the reconfiguration time interval of the control program, one or more configuration lists are changed based on the detected change.

According to another exemplary, non-limiting formulation of the present invention, an automation device is provided. The automation device includes a hardware configuration with a number of hardware components, a control program controlling a technical process, and a CPU cyclically executing the control program. In this automation device, configuration data is supplied to the CPU of the automation device to signal the hardware configuration of the automation device. In response to the supplied configuration data, the CPU generates one or more configuration lists to which the CPU performs read and/or write accesses during an open loop control. In this automation device, the CPU evaluates the supplied configuration data for a change in the hardware configuration, and when a change in the hardware configuration is detected, the CPU inserts a reconfiguration time interval into the cycle of the control program. Moreover, during the reconfiguration time interval, the CPU changes the one or more configuration lists based on the detected change of the control program.

According to exemplary, non-limiting formulations, the configuration data of a new hardware configuration can be evaluated without the CPU unit having to switch to a STOP mode. As a result, the centralized and decentralized peripheral modules do not need to assume a controlled state and the control can be resumed immediately after the configuration and/or reconfiguration. In other words, the CPU module remains in the "RUN" mode.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements.

DETAILED DESCRIPTION OF ILLUSTRATIVE, NON-LIMITING EMBODIMENTS

Figure 1:
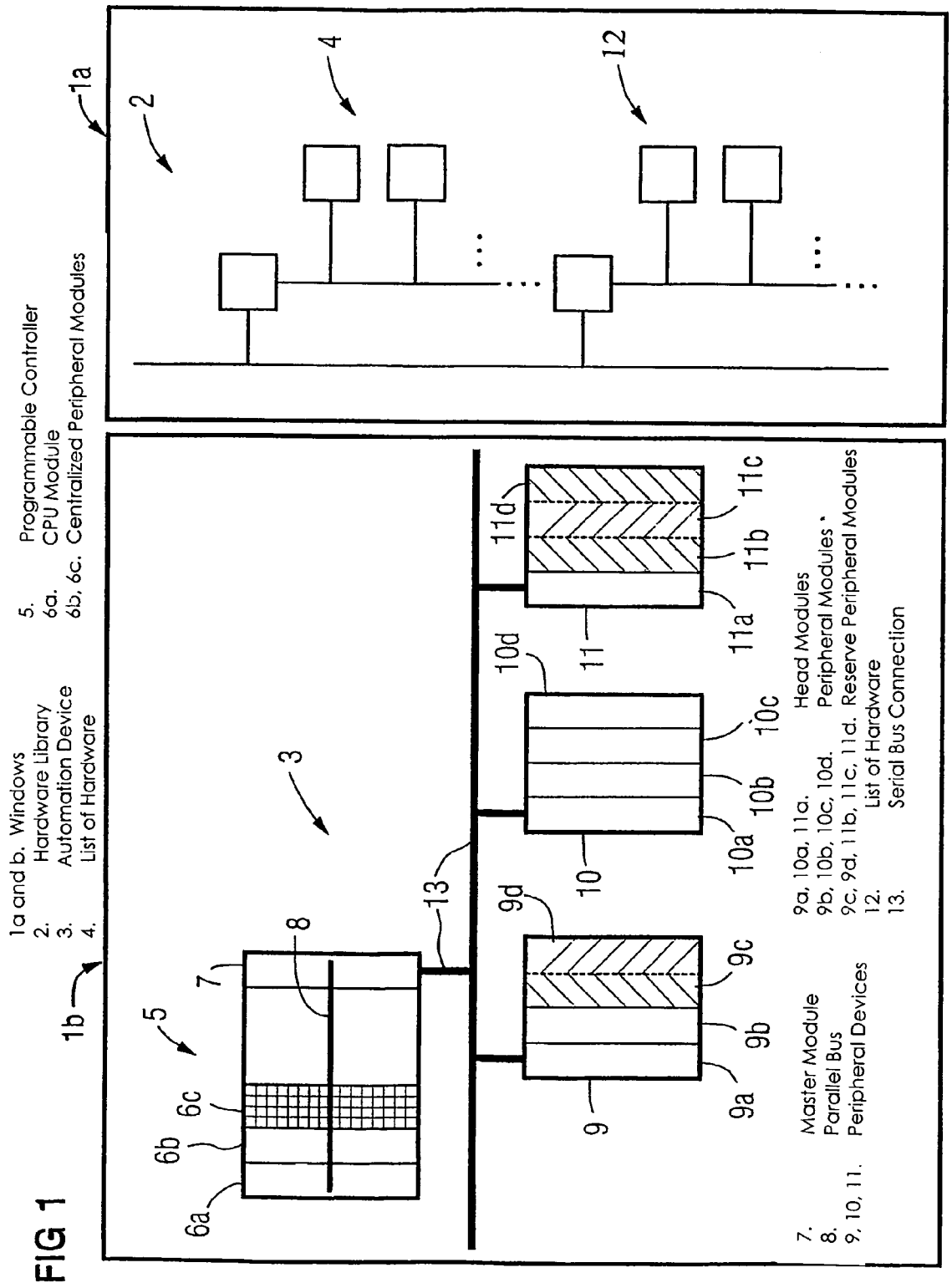
FIG. 1 shows a user interface of an engineering system in accordance with an exemplary, non-limiting embodiment of the present invention.

FIG. 1 shows an engineering system with a display in accordance with an exemplary, non-limiting embodiment of the present invention. This display has two windows of a user interface, designated 1a and 1b, respectively. The window 1a is provided to display a hardware library 2 of an automation device, while the window 1b displays the currently configured hardware of an automation device 3. The hardware library 2 contains configuration data for hardware components of a programmable controller, e.g., in the form of CPU modules, communication modules, digital input and/or output modules, and configuration data for modules of peripheral devices and bus systems with associated bus connections. To configure the automation device, an operator uses his mouse in a drag and drop operation to select a hardware component from the window 1a, to copy the selected hardware component to the window 1b, and to combine the components in the window 1b with a copied component in accordance with a control task to be solved.

In the depicted example, it is assumed that a programmable controller 5 with a CPU module 6a, two centralized peripheral modules 6b and 6c, and a master module 7 is selected from a list 4 of the hardware library 2. The master module 7 forms part of the decentralized peripherals and can be connected, on the one hand, to the modules 6a, 6b, and 6c via a parallel bus 8 and, on the other hand, to peripheral devices 9, 10, and 11, via a serial bus 13. Of course, the master module 7 does not necessarily have to be an independent module but can also be a component of the CPU module 6a.

Moreover, in the depicted example, it is further assumed that a first, a second, and a third peripheral device 9, 10, and 11, respectively, are selected from a list 12 of the hardware library 2. These peripheral devices 9, 10, and 11, each have a head module 9a, 10a, and 11a, respectively. These head modules 9a, 10a, and 11a are also selectable from the hardware library 2 and are connected to the master module 7 via a serial bus connection 13. The serial bus connection 13 is likewise selected from the hardware library 2.

In addition to the peripheral devices 9, 10, and 11, peripheral modules can be configured for each peripheral device 9, 10, and 11, e.g., in the form of digital and/or analog input/output modules. In the depicted example, a maximum of three peripheral modules can be inserted into each of the peripheral devices 9, 10, and 11. This maximum number of peripheral modules is provided by way of an example only and is not intended to limit the scope of the claims. One of ordinary skill in the art would readily understand that a different maximum number of peripheral modules is possible.

In the exemplary embodiment depicted in FIG. 1, the maximum possible number of three insertable peripheral modules 10b, 10c, and 10d, which can be provided with different functionalities, are configured only for the peripheral device 10. In contrast, for the peripheral device 9, only one peripheral module 9b is configured, and for the peripheral device 11, no peripheral modules are configured.

The engineering system is designed to permit an operator, in addition to configuring peripheral modules 6b, 6c, 9b, 10b, 10c, and 10d required for control, to configure other peripheral modules as "reserve peripheral modules." The "reserve peripheral modules" indicate to the CPU unit 6a that they are provided for a possible reconfiguration during the control. The control can be an open loop control or a closed loop control. The reserve peripheral modules are specially identified in the window 1b.

In the depicted example, the peripheral modules 9c, 9d, 11b, 11c, and 11d that are shown hatched are identified as reserve peripheral modules. These peripheral modules 9c, 9d, 11b, 11c, and 11d are provided for an expansion of the automation device, if needed. In addition, the engineering system can provide the peripheral modules with an identifier. The identifier can be obtained from the automation device during the control while the reconfiguration is taking place. In the depicted example, the centralized peripheral module 6c which is identified by a cross-hatching in the window 1b, is such a peripheral module.

Figure 2:
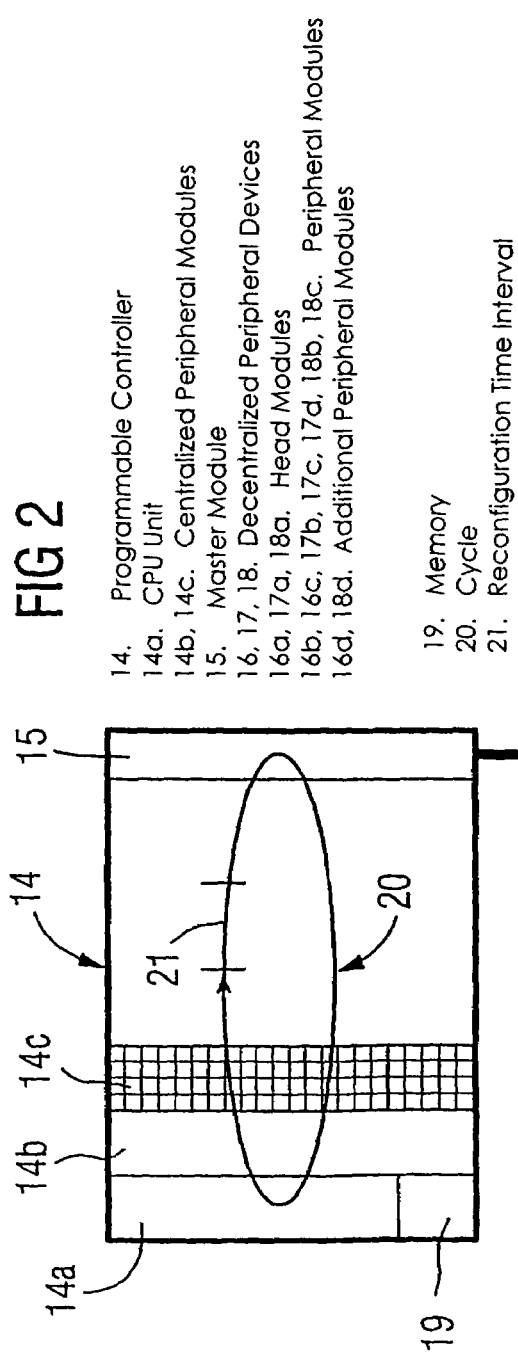
FIG. 2 shows a configured automation device in accordance with another exemplary, non-limiting embodiment of the present invention.
Figure 2:
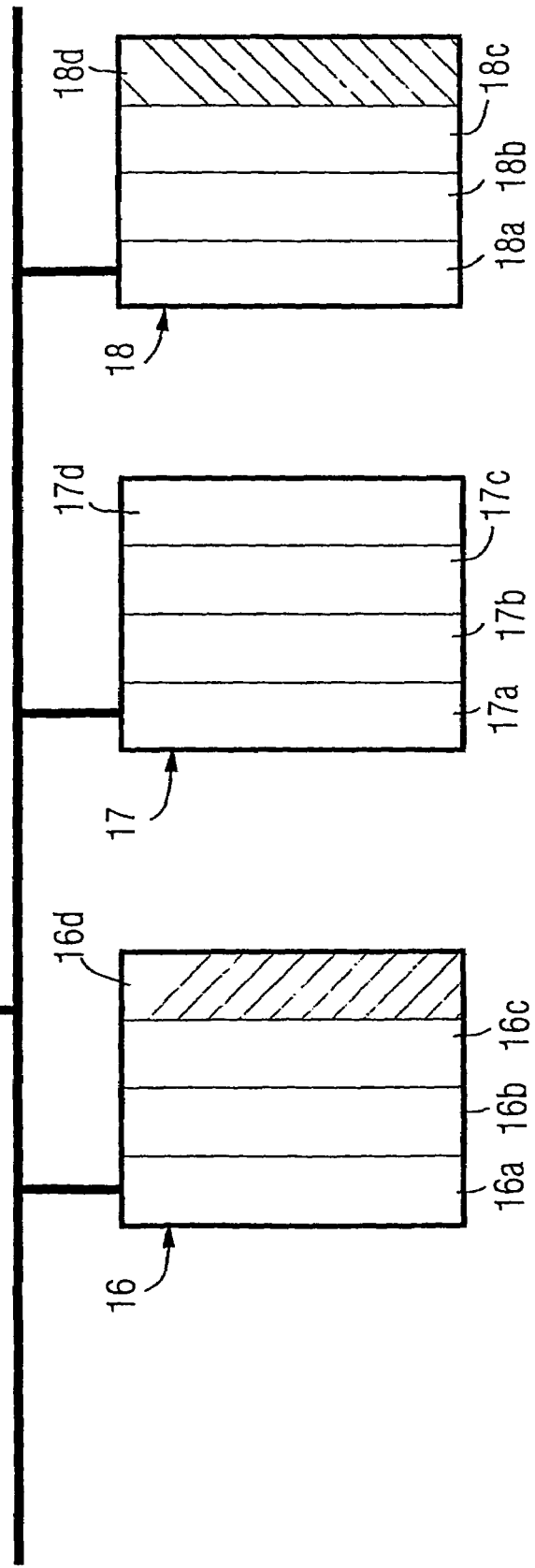

Reference is now made to FIG. 2, which depicts a configured automation device in accordance with an exemplary, non-limiting embodiment of the present invention. The components of this configured automation device for controlling a technical process are a programmable controller 14 with a higher-level CPU unit 14a, two centralized peripheral modules 14b and 14c, a master module 15, and three decentralized peripheral devices 16, 17, and 18. The master module 15, and the decentralized peripheral devices 16, 17, and 18 connected to the master module 15, are components of so-called "decentralized peripherals." Of course, the master module 15 does not necessarily have to be a part of the programmable controller 14. Instead, the master module 15 can be a component of an expansion device (not depicted) of the automation device.

The peripheral devices 16, 17, and 18 each have a respective head module 16a, 17a, and 18a. The master module 15 performs read and/or write accesses to the peripheral modules of the decentralized peripheral devices 16, 17, and 18 via their respective head modules 16a, 17a, and 18a. The peripheral device 17 is equipped with three peripheral modules 17b, 17c, 17d, while the peripheral devices 16 and 18 are each equipped with only two peripheral modules 16b and 16c, and 18b and 18c, respectively.

In the depicted example, it is assumed that a desired change in the configuration e.g., involving an expansion in the control task, requires the centralized peripheral module 14c to be replaced by decentralized peripheral modules. To implement this change in the control task, the following change in the configuration is made: the peripheral device 16 is expanded by an additional peripheral module 16d, e.g., a slave module in the form of an analog input module, the peripheral device 18 is expanded by a peripheral module 18d, e.g., in the form of a digital output module, and the peripheral module 14c is removed from the programmable controller 14.

To implement this exemplary change in the hardware configuration, a user first generates configuration data corresponding to the new hardware configuration in a manner such as described above. The user then transmits the generated configuration data to the CPU module 14a, which stores these configuration data in a memory 19 of the CPU module 14a. The CPU module 14a evaluates the generated configuration data with respect to a change in the hardware configuration. In the depicted example, the CPU module 14a detects that the peripheral devices 16 and 18, described above, must each be expanded by an additional respective peripheral module 16d and 18d and that the centralized peripheral module 14c must be removed from the programmable controller 14.

In order to determine the changes in the hardware configuration, the CPU module 14a also stores in its memory 19 old configuration data. To ensure that the CPU module 14a does not have to compare all of the new configuration data with the old configuration data, it is advantageous if both the "reserve peripheral modules" as well as the centralized and/or decentralized peripheral modules that are to be removed from the hardware configuration are marked during the configuration; thereby, allowing the CPU module 14a to evaluate only the marked configuration data.

Based on the evaluation result, the CPU module 14a inserts a reconfiguration time interval 21 into a cycle 20 of a control program. Accordingly, the control program cycle 20 is expanded by this time interval 21. During the reconfiguration time interval 21, the CPU module 14a does not access the configuration list to influence the process to be controlled, but changes the configuration list according to the changed configuration data. As a result, the automation device is prepared for a physical change in the hardware configuration, which means that an operator can add the new configured modules 16d and 18d or remove the now obsolete module 14c. Such a physical change in the hardware configuration is usually carried out before the control program is adapted. The control program can be adapted by removing or adding corresponding software function blocks after the reconfiguration.

The above description of illustrative, non-limiting embodiments has been given by way of an example. The above and other features of the invention including various novel method steps and a device of the various novel components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A method for reconfiguring an automation device comprising a hardware configuration with a plurality of hardware components and a control program, cyclically executed by a CPU of the automation device, for controlling a technical process, where configuration data are supplied to the automation device signaling the hardware configuration of the automation device to the CPU and where the CPU generates at least one configuration list for performing at least one of a read access and a write access by the CPU, the method comprising:

evaluating the supplied configuration data for a change in the hardware configuration;

inserting a reconfiguration time interval into the cycle of the control program for controlling the technical process when the change in the hardware configuration is detected; and changing the at least one configuration list based on the detected change during the reconfiguration time interval of the control program, wherein the reconfiguration time interval is executed during a run mode in which the CPU runs the control program without interrupting the technical process by switching the automation device to a stop mode, and wherein the technical process comprises a process implemented by at least two equipment units used in manufacturing of a product.

2. The method according to claim 1, wherein the change in the hardware configuration comprises at least one of removing at least one hardware component from said plurality of hardware components and adding at least one hardware component from said plurality of hardware components.

3. The method according to claim 1, wherein the change in the hardware configuration comprises at least one of removing from a peripheral device at least one hardware component and adding to the peripheral device at least one hardware component.

4. The method according to claim 1, wherein the change in the hardware configuration comprises at least one of replacing the configuration data in the configuration list of at least one reserve hardware component with the configuration data of at least one hardware component and replacing the configuration data in the configuration list of at least one hardware component with the configuration data of the at least one reserve hardware component.

5. The method according to claim 1, wherein changes in the supplied configuration data are marked, and wherein evaluating the supplied configuration data for the change in the hardware configuration comprises evaluating only the marked data of the supplied configuration data.

6. The method according to claim 1, wherein the CPU utilizing the configuration list performs at least one of the read access and the write access during an open loop control.

7. The method according to claim 1, wherein the CPU utilizing the configuration list performs at least one of the read access and the write access during a closed loop control.

8. The method according to claim 1, wherein the evaluating of the supplied configuration data for the change in the hardware configuration comprises comparing the supplied configuration data, which is supplied from an engineering system designing changes for the hardware configuration of the automation device, with old configuration data stored in the CPU.

9. The method according to claim 1, wherein the supplied configuration data comprises data about unconnected hardware that cannot communicate with the CPU prior to the changing of the at least one configuration list.

10. The method according to claim 1, wherein the run mode comprises executing the control program by the CPU and wherein, during the execution of the cycle of the control program by the CPU, the CPU inserts the reconfiguration time interval into the executing control program that controls peripheral devices connected to the CPU via a serial bus.

11. The method according to claim 1, wherein the execution of the control program by the CPU remains uninterrupted by the insertion of the reconfiguration time interval into the control program being executed.

12. The method according to claim 1, wherein the technical process is controlled based on performing automation tasks in fields of production engineering, process engineering, and systems control engineering.

13. An automation device comprising:
a hardware configuration with a plurality of hardware components;
a control program controlling a technical process, and
a CPU cyclically executing the control program,
wherein configuration data supplied to the CPU signals the hardware configuration, and in response to the supplied configuration data, the CPU generates at least one configuration list for performing at least one of a read access and a write access,
wherein the CPU evaluates the supplied configuration data for a change in the hardware configuration, and when the change in the hardware configuration is detected, the CPU inserts a reconfiguration time interval into the cycle of the control program, and during the reconfiguration time interval the CPU changes the at least one configuration list based on the detected change,
wherein the reconfiguration time interval is executed during a run mode in which the CPU runs the control program without interrupting the technical process by switching the automation device to a stop mode, and
wherein the technical process comprises a process implemented by at least two equipment units used in manufacturing of a product.

14. The automation device according to claim 13, wherein the change in the hardware configuration comprises at least one of removing at least one hardware component from said plurality of hardware components and adding at least one hardware component from said plurality of hardware components.

15. The automation device according to claim 13, wherein the change in the configuration data comprises at least one of removing from a peripheral device at least one hardware component from said plurality of hardware components and adding to the peripheral device at least one hardware component from said plurality of hardware components.

16. The automation device according to claim 15, wherein the change in the hardware configuration comprises at least one of replacing the configuration data in the configuration list of at least one reserve hardware component with the configuration data of at least one hardware component and replacing the configuration data in the configuration list of at least one hardware component with the configuration data of at least one reserve hardware component.

17. The automation device according to claim 13, wherein changes in the supplied configuration data are marked, and wherein the CPU evaluates only the marked portions of the supplied configuration data detecting the change in the hardware configuration.

18. The automation device according to claim 13, wherein the CPU utilizing the configuration list performs at least one of the read access and the write access during an open loop control.

19. The automation device according to claim 13, wherein the CPU utilizing the configuration list performs at least one of the read access and the write access during a closed loop control.

20. The automation device according to claim 13, wherein the supplied configuration data comprises data about unconnected hardware.

* * * * *